United States Patent
Nanba et al.

(10) Patent No.: US 6,670,047 B2
(45) Date of Patent: Dec. 30, 2003

(54) STRETCHED POLYAMIDE FILM

(75) Inventors: Hiroyuki Nanba, Kanagawa-ken (JP); Koji Yamamoto, Kanagawa-ken (JP)

(73) Assignee: Mitsubishi Gas Chemical Co., Inc., Tokyo (JP)

( * ) Notice: Subject to any disclaimer, the term of this patent is extended or adjusted under 35 U.S.C. 154(b) by 134 days.

(21) Appl. No.: 10/053,668

(22) Filed: Jan. 24, 2002

(65) Prior Publication Data

US 2002/0142179 A1 Oct. 3, 2002

(30) Foreign Application Priority Data

Feb. 1, 2001 (JP) ........................................ 2001-025816

(51) Int. Cl.$^7$ ........................... B32B 27/08; B32B 27/34
(52) U.S. Cl. ................. 428/474.4; 428/474.7; 428/474.9; 428/475.5; 428/475.8; 428/476.3; 525/66
(58) Field of Search .................. 525/66; 428/474.4, 428/476.3, 474.7, 474.9, 475.5, 475.8

(56) References Cited

U.S. PATENT DOCUMENTS 6,294,263 B1 * 9/2001 Okudaira et al. ........ 428/474.4

FOREIGN PATENT DOCUMENTS

EP 0527237 * 9/1992

* cited by examiner

Primary Examiner—Ana Woodward
(74) Attorney, Agent, or Firm—Sherman & Shalloway

(57) ABSTRACT

A stretched polyamide film obtained by melt-kneading and extruding a mixed resin (Z) containing a polyamide resin (X) and a modified resin (Y) into a film followed by biaxial stretching, wherein the polyamide resin (X) is obtained from a diamine component containing not less than 70 mol % of a metaxylylenediamine and from a dicarboxylic acid component containing not less than 70 mol % of an α,ω-aliphatic dicarboxylic acid having 6 to 12 carbon atoms; the modified resin (Y) is obtained by graft-modifying an ethylene-ethyl acrylate copolymer resin with a maleic anhydride; and the mixed resin (Z) contains from 80 to 99% by weight of the polyamide and from 20 to 1% by weight of the modified resin. The stretched film exhibits not only excellent transparency and gas-barring property but also excellent flexibility and shock resistance.

5 Claims, No Drawings

STRETCHED POLYAMIDE FILM

BACKGROUND OF THE INVENTION

1. Field of the Invention

The present invention relates a stretched gas-barring polyamide film having flexibility, impact resistance and pinhole resistance, which can be boiled or retorted.

2. Description of the Prior Art

As gas-barring packaging materials, there have been used multi-layer films by using a polyvinylidene chloride (PVDC), an ethylene-vinyl alcohol copolymer (EVOH) or a polyamide as a gas barrier layer. Among the polyamides, a metaxylylene group-containing polyamide obtained by polycondensing a metaxylylenediamine with an $\alpha,\omega$-aliphatic dicarboxylic acid having 6 to 12 carbon atoms, loses gas-barring property less and recovers gas-barring property more than those of other gas-barring resins when it is subjected to the boiling or the retorting. In particular, the polymetaxylyleneadipamide (hereinafter often referred to as nylon MXD6) using an adipic acid as the $\alpha,\omega$-alphatic dicarboxylic acid having 6 to 12 carbon atoms, is now finding spreading applications in the field of packaging by utilizing the above-mentioned features.

When not stretched, the nylon MXD6 has such defects as small impact resistance and low flexibility. When stretched, the nylon MXD6 exhibits impact resistance and flexibility which are improved to some extent. With the nylon MXD6 alone, however, the improvement is not satisfactory and a further improvement is desired. There have been proposed a method of adding a polyolefin to the nylon MXD6 (Japanese Unexamined Patent Publication (Kokai) No. 77373/1993), a method of adding a modified polyolefin (Japanese Patent Nos. 3021854 and 3021851), a method of adding ionomers (Japanese Unexamined Patent Publications (Kokai) Nos. 193081/1993, 117198/1995 and 276591/1995), and a method of adding a polyamide elastomer (Japanese Unexamined Patent Publications (Kokai) Nos. 224844/1996 and 165427/1995) without, however, accomplishing impact resistance and flexibility to a satisfactory degree.

SUMMARY OF THE INVENTION

The present inventors have conducted study in an effort to improve the impact resistance of a metaxylylene group-containing polyamide film by blending it with various resins, have discovered the fact that the gas-barring property, flexibility and impact resistance can be greatly improved yet maintaining a practically acceptable level of transparency by blending the xylylene group-containing polyamide with a modified product of an ethylene-ethyl acrylate copolymer resin, and have arrived at the present invention.

According to the present invention, there is provided a stretched polyamide film obtained by melt-kneading and extruding a mixed resin (Z) containing a polyamide resin (X) and a modified resin (Y) into a film followed by biaxial stretching, wherein:

the polyamide resin (X) is obtained by polycondensing a diamine component containing not less than 70 mol % of a metaxylylenediamine with a dicarboxylic acid component containing not less than 70 mol % of an $\alpha,\omega$-aliphatic dicarboxylic acid having 6 to 12 carbon atoms;

the modified resin (Y) is obtained by graft-modifying an ethylene-ethyl acrylate copolymer resin with a maleic anhydride; and the mixed resin (Z) contains from 80 to 99% by weight of the polyamide and from 20 to 1% by weight of the modified resin.

According to the present invention, further, there is provided a multi-layer stretched polyamide film obtained by biaxially stretching the multi-layer film that is obtained by melting and simultaneously extruding the mixed resin (Z), an adhesive resin and a thermoplastic resin (excluding the polyamide resin (X) and the resin (Y), the same holds hereinafter).

DETAILED DESCRIPTION OF THE INVENTION

[Polyamide Resin (X)]

A polyamide resin (X) used in the present invention is obtained by polycondensing a diamine component containing not less than 70 mol % of a metaxylylene diamine with a dicarboxylic acid component containing not less than 70 mol % of an $\alpha,\omega$-aliphatic dicarboxylic acid having 6 to 12 carbon atoms.

According to the present invention, there is obtained a stretched film maintaining a predetermined gas-barring property by using the diamine component containing not less than 70 mol % of a metaxylylenediamine. The diamine component may contain any other diamine as far as it contains the metaxylylenediamine in an amount of not less than 70 mol %. Examples of the other diamine include paraxylylenediamine, orthoxylylenediamine, bisaminomethylcyclohexane, tetramethylenediamine, pentamethylenediamine, hexamethylenediamine, heptamethylenediamine, octamethylenediamine, nonamethylenediamine, orthophenylenediamine, metaphenylenediamine and paraphenylenediamine. These other diamines can be used in a single kind or in a combination of two or more kinds together with the metaxylylenediamine.

Use of the dicarboxylic acid component containing not less than 70 mol % of the $\alpha,\omega$-aliphatic dicarboxylic acid having 6 to 12 carbon atoms enables the polyamide resin to exhibit practicable properties. Representative examples of the $\alpha,\omega$-aliphatic dicarboxylic acid having 6 to 12 carbon atoms include adipic acid and sebacic acid to which only, however, the invention is in no way limited. These dicarboxylic acids can be used in one kind or being mixed together in two or more kinds. The dicarboxylic acid component may contain any other dicarboxylic acid as far as it contains the above $\alpha,\omega$-aliphatic dicarboxylic acid in an amount of not less than 70 mol %. Though not being limited thereto only, the other dicarboxylic acids will be aromatic dicarboxylic acids such as isophthalic acid and terephthalic acid. These other dicarboxylic acids, too, can be used in one kind or in a combination of two or more kinds together with the above-mentioned $\alpha,\omega$-aliphatic dicarboxylic acid.

The above-mentioned polyamide resin (X) may have a molecular weight large enough for forming a film. From the standpoint of gas-barring property, further, the nylon MXD6 using the adipic acid as the dicarboxylic acid component is particularly suited as the polyamide resin

[Modified Resin (Y)]

A modified resin (Y) used in combination with the above-mentioned polyamide resin (X) is obtained by graft-modifying an ethylene-ethyl acrylate copolymer resin with a maleic anhydride.

It is desired that the ratio of the ethylene copolymerization (ethylene content) in the ethylene-ethyl acrylate copolymer resin that is to be graft-modified, is in a range of from 5 to 50 mol %.

Further, the ethylene-ethyl acrylate copolymer resin should be graft-modified with a maleic anhydride. When the unmodified ethylene-ethyl acrylate copolymer resin is used or when an unsaturated carboxylic anhydride other than the maleic anhydride is used as a modifier, the flexibility is not improved and the transparency becomes worse. In order to maintain a sufficient degree of flexibility and transparency, further, it is desired that the maleic anhydride is used in an amount of from 1 to 30% by weight per the ethylene-ethyl acrylate copolymer.

[Mixed Resin (Z)]

In the present invention, a mixed resin (Z) of the above-mentioned polyamide resin (X) and the modified resin (Y), contains the polyamide resin (X) in an amount of from 80 to 99% by weight and, particularly, from 90 to 97.5% by weight and contains the modified resin (Y) in an amount of from 1 to 20% by weight and, particularly, from 2.5 to 10% by weight. Namely, a favorable impact resistance is maintained by using the polyamide resin (X) in an amount that lies in the above-mentioned range, and a favorable gas-barring property and transparency are maintained by using the modified resin (Y) in an amount that lies in the above-mentioned range.

The mixed resin (Z) according to the present invention may further be blended with other resins and known additives so far as it contains the polyamide resin (X) and the modified resin (Y) in amounts lying within the above-mentioned ranges. In order to further improve the flexibility and impact resistance of the film, the mixed resin (z) may be further blended, as required, with aliphatic amides such as nylon 6, nylon 66, nylon 6-66 and amorphous nylon. As the additive, there can be exemplified antistatic agent, lubricating agent, anti-blocking agent, stabilizer, dye and pigment.

The mixed resin (Z) is obtained by dry-blending the mixed components or by melt-kneading the mixed components, and is put to the use through a single screw or a twin screw extruder.

[Stretched Film]

A stretched film of the present invention is obtained by melt-extruding the mixed resin (Z) of the polyamide resin (X) and the modified resin (Y), and by stretching a green film that is obtained through an ordinary film-making method such as T-die method or cylindrical die method (inflation method).

It is desired that the mixed resin (Z) is melt-extruded at 250 to 290° C. and, preferably, at 250 to 270° C. When the extrusion temperature is high, there may occur decomposition, gelling, coloring and foaming.

The stretching method may be a simultaneous biaxial stretching method or a sequential stretching method. The magnifications of stretching are from 2 to 5 times, preferably, from 2.5 to 4.5 times and, more preferably, from 3 to 4 times in either the MD direction or the TD direction. With the magnifications of stretching lying within the above-mentioned range, it is allowed to obtain favorable gas-barring property. The stretching temperature is desirably from 80 to 120° C. and, particularly, from 90 to 110° C. When the stretching temperature is lower than the above-mentioned range, the stretching tends to become defective. When the stretching temperature is higher than the above-mentioned range, there easily takes place defective stretching and whitening. As desired, further, the heat-setting may be executed after the stretching or during the stretching.

The thus obtained stretched film of the present invention by itself (i.e., as a single-layer film) possesses satisfactory impact resistance and flexibility, and exhibits excellent gas-barring property and transparency.

According to the present invention, the single-layer stretched film can be used as a gas barrier layer in the multi-layer film making it possible to obtain a film having further improved impact resistance and flexibility. It is widely accepted practice to use the single-layer stretched film as a layer (gas barrier layer) of the multi-layer film.

The above-mentioned multi-layer film is prepared by, for example, forming a single-layer stretched film of the mixed resin (Z) and laminating it on another separately prepared thermoplastic resin film. The another thermoplastic resin film to be laminated is desirably formed of a polyolefin, a polyester or a polyamide other than the polyamide resin (X). The other thermoplastic resin film may be either a stretched film or a non-stretched film. Further, the single-layer stretched film formed of the mixed resin (Z) and the another thermoplastic resin film are laminated one upon the other by using, as required, an adhesive. Though there is no particular limitation, an adhesive resin that will be described later can be used as the adhesive so far as it does not impair the properties of the above-mentioned single-layer stretched film or of the another thermoplastic resin film.

The multi-layer film including the single-layer stretched film of the mixed resin (Z) as the gas barrier layer can also be prepared by simultaneously melt-extruding the mixed resin (z), adhesive resin and thermoplastic resin (excluding the polyamide resin (X) and the modified resin (Y)) to prepare a green film (unstretched multi-layer film) followed by stretching.

The above green film (unstretched multi-layer film) is prepared by the coextrusion T-die method or the coextrusion cylindrical die method (inflation method). As the stretching method, there can be employed a biaxial simultaneously stretching method or a biaxial sequentially stretching method. Like that of the above single-layer stretched film, the stretching ratios are from 2 to 5 times, preferably, from 2.5 to 4.5 times and, more preferably, from 3 to 4 times in either the MD direction or the TD direction. Upon confining the stretching ratios within the above-mentioned range, it is allowed to maintain the gas-barring property.

The extrusion temperature and the stretching temperature for the multi-layer film can be suitably selected by making reference to the extrusion temperature of the mixed resin (Z). As required, further, the heat-setting can be effected during the stretching or after the stretching.

As the thermoplastic resin other than the polyamide resin (X) and the modified resin (Y) according to the present invention, there can be used low-density polyethylene, high-density polyethylene, linear low-density polyethylene, polypropylene, polybutene, copolymer thereof, ionomer resin, ethylene-acrylic acid copolymer, ethylene-vinyl acetate copolymer, modified polyolefin resin and mixtures thereof. Among them, it is desired to use low-density polyethylene, high-density polyethylene, linear low-density polyethylene or polypropylene. It is further allowable to use a polyamide other than the polyamide resin (X) or a polyester.

As the adhesive resin, further, there can be used ethylene-vinyl acetate copolymer or a resin obtained by graft-modifying high-density polyethylene, low-density polyethylene, linear low-density polyethylene or polypropylene with unsaturated carboxylic acid or an anhydride thereof such as maleic anhydride, or a composition containing the above graft-modified resin as a chief component.

The above-mentioned multi-layer stretched film is allowed to assume a variety of layer constitutions. When the layer of the mixed resin (Z) is denoted by A, the adhesive resin layer by B and the thermoplastic resin layer by C, there can be constituted a three-kind-three-layer film laminated in order of A/B/C and a three-kind-five-layer film laminated in order of C/B/A/B/C. There can be further constituted a film of a constitution A/B/A/B/C.

The stretched polyamide film and the multi-layer stretched film of the present invention little lose the gas-barring property even after subjected to the boiling or the retorting and, besides, quickly recover the gas-barring property lending themselves well for being used as materials for packaging foods such as processed meet products, boiled foods and retort foods, and as various other kinds of packaging materials.

The form of packaging may be a bag that is heat-sealed or is knotted by using a metal such as a clip without any limitation. In the case of a tubular film, the package may be cut into a predetermined size and, as required, an opening may be heat-sealed or knotted.

Owing to the use of the mixed resin (Z) comprising the polyamide(X) and the resin (Y) as the gas barrier layer, the stretched polyamide film and the stretched multi-layer polyamide film of the present invention exhibit excellent transparency, impact resistance and pinhole resistance, and can further be subjected to the boiling or the retorting, lending themselves well as materials for packaging foods, medicines, industrial chemicals, cosmetics, inks and the like.

EXAMPLES

In the following Examples and Comparative Examples, properties of the films were measured and evaluated in compliance with the methods described below.
(1) Cloudiness Value Measured in compliance with ASTM D1003 by using a differential turbidity measuring instrument (Model COH-300A) manufactured by Nihon Denshoku Kogyo Co.
(2) Oxygen Permeability Measured in compliance with ASTM D3985 by using an oxygen permeability measuring instrument (Model OX-TRAN 10/50A) manufactured by Modern Controls Co., under the conditions of 23° C. and a relative humidity of 60%.
(3) Impact Testing Measured in compliance with ASTM D781 by using a film impact tester (Model ITF-60) manufactured by Tosoku Seimitsu Kogyo Co., under the conditions of 23° C. and a relative humidity of 50% RH.
(4) Flexibility Testing (Pinhole Resistance Testing)

Measured by using the Gelboh Flex Tester manufactured by Rigaku Kogyo Co. under the conditions of 23° C. and a relative humidity of 50% RH. After bent a predetermined number of times, the number of pinholes were counted by using a pinhole tester.

Example 1

A polyamide resin described below in an amount of 95 parts by weight and a graft-modified resin in an amount of 5 parts by weight were dry-blended to prepare a mixed resin.
Polyamide resin:
Nylon MXD6
Trade name: MX Nylon 6007 manufactured by Mitsubishi Gas Chemical Company, Inc. (hereinafter often referred to as N-MXD6).
Graft-modified resin:
A resin obtained by graft-modifying an ethylene-ethyl acrylate copolymer resin with a maleic anhydride.
Trade name: HPR AR-201 manufactured by Mitsui-Du Pont Polychemical Co. (hereinafter often referred to as AR-201).

The mixed resin was extruded from an extruder having a cylinder diameter of 20 mm (Laboplasto-mill manufactured by Toyo Seiki Mfg. Co.) at 260 to 270° C. to prepare a green film having a thickness of 300 $\mu$m by the T-die/cold rolling method.

By using a biaxially stretching machine (tenter method) manufactured by Toyo Seisakusho Co., the green film was biaxially stretched into 4 times in both the TD and MD directions at a stretching temperature of 110° C. to obtain a single-layer stretched film.

The obtained single-layer stretched film was measured for its transparency (cloudiness value), impact piercing strength, pinhole resistance and oxygen permeability. The results were as shown in Table 1.

Example 2

The single-layer stretched film obtained in Example 1 was used as a surface substrate film, and an LLDPE film (trade name: Unilax LS722C, 50 $\mu$m thick, manufactured by Idemitsu Sekiyu Kagaku Co.) was used as a sealant film. These two films were dry-laminated one upon the other to obtain a laminated film.

The obtained laminated film was measured for its transparency (cloudiness value), impact piercing strength, pinhole resistance and oxygen permeability. The results were as shown in Table 2.

Example 3

The following resins were prepared for forming a layer A, a layer B and a layer C.
Resin for forming the layer A:
Mixed resin prepared in Example 1.
Resin for forming the layer B:
Adhesive polyethylene.
Trade name: Adomer NF300, manufactured by Mitsui Kagaku Co.
Resin for forming the layer C:
Linear low-density polyethylene.
Trade name: Ultozecs 2022L, manufactured by Mitsui Kagaku Co. (hereinafter often abbreviated as LLDPE).

The LLDPE (resin for forming the layer C) was extruded from an extruder having a cylinder diameter of 45 mm, the adhesive polyethylene (resin for forming the layer B) was extruded from an extruder having a cylinder diameter of 40 mm and the mixed resin (resin for forming the layer A) was extruded from an extruder having a cylinder diameter of 30 mm at temperatures of from 200 to 210° C., from 190 to 200° C. and from 260 to 270° C., respectively, to form a molten multi-layered state through a feed block, so that the layer constitution was in order of layer C/layer B/layer A/layer B/layer C, and from which a three-kind-five-layer film was prepared by a cylindrical die/water-cooled inflation method.

The obtained multi-layer film was biaxially stretched simultaneously by a tubular method at a stretching temperature of 100° C. followed by the heat-setting to obtain a multi-layer stretched film.

The multi-layer stretched film was measured concerning the thicknesses of the layers, total thickness, transparency (cloudiness value), impact piercing strength, pinhole resistance and oxygen permeability. The results were as shown in Table 3.

Comparative Example 1

By using the same apparatus as the one used in Example 1, a single-layer stretched film was prepared by using the nylon MXD6 only without using the graft-modified resin.

The obtained single-layer stretched film was measured for its transparency (cloudiness value), impact piercing strength, pinhole resistance and oxygen permeability to be as shown in Table 1.

Comparative Example 2

A mixed resin was prepared in quite the same manner as in Example 1 but using the polyamide resin (N-MXD6) in an amount of 70 parts by weight and the graft-modified resin (AR-201) in an amount of 30 parts by weight. By using this mixed resin, a single-layer stretched film was prepared.

The obtained single-layer stretched film was measured for its transparency (cloudiness value), impact piercing strength, pinhole resistance and oxygen permeability to be as shown in Table 1.

Comparative Example 3

By using the single-layer stretched film obtained in Comparative Example 1, there was obtained a laminated film in the same manner as in Example 2.

The obtained laminated film was measured for its transparency (cloudiness value), impact piercing strength, pinhole resistance and oxygen permeability to be as shown in Table 2.

Comparative Example 4

A multi-layer stretched film was obtained in the same manner as in Example 3 but by using the nylon MXD6 as the resin for forming the layer A instead of using the mixed resin.

The obtained multi-layer stretched film was measured concerning the thicknesses of the layers, total thickness, transparency (cloudiness value), impact piercing strength, pinhole resistance and oxygen permeability. The results were as shown in Table 3.

Comparative Example 5

A mixed resin was prepared in quite the same manner as in Example 1 but using the polyamide resin (N-MXD6) in an amount of 95 parts by weight and an ionomer resin (Himilan AM 6004 produced by Mitsui-du Pont Co.) in an amount of 5 parts by weight instead of using the graft-modified resin (AR-201). By using this mixed resin, a single-layer stretched film was prepared.

The obtained single-layer stretched film was measured for its transparency (cloudiness value), impact piercing strength, pinhole resistance and oxygen permeability to be as shown in Table 1.

TABLE 1

Single-layer stretched polyamide film

|  | Ex. 1 | Comp. Ex. 1 | Comp. Ex. 2 | Comp. Ex. 5 |
|---|---|---|---|---|
| Blending ratio (wt ratio) of mixed resin (Z) | | | | |
| N-MXD6 | 95 | 100 | 70 | 95 |
| AR-201 | 5 | 0 | 30 | — |
| AM 6004 | — | — | — | 5 |
| Thickness of film ($\mu$m) | 15 | 15 | 15 | 15 |
| Evaluation | | | | |
| Cloudiness (%) | 1.5 | 2.2 | 15.8 | 11.2 |
| Oxygen permeability (cc/m$^2$ · day · atm) | 3.5 | 3.3 | 20.0 | 4.0 |
| Impact strength (Kg-cm) | 23.7 | 19.1 | 25.6 | 20.3 |
| Number of pinholes (per 500 times) | 1 | 30 | 1 | 1 |

TABLE 2

Laminated film

|  | Ex. 2 | Comp. Ex. 3 |
|---|---|---|
| Blending ratio (wt ratio) of mixed resin (Z) | | |
| N-MXD6 | 95 | 100 |
| AR-201 | 5 | 0 |
| Thickness of mixed resin film ($\mu$m) | 15 | 15 |
| Thickness of sealant (LLDPE) ($\mu$m) | 50 | 50 |
| Evaluation | | |
| Cloudiness (%) | 7.2 | 4.2 |
| Oxygen permeability (cc/m$^2$ · day · atm) | 4.0 | 3.8 |
| Impact strength (Kg-cm) | 25.1 | 17.1 |
| Number of pinholes (per 500 times) | 0 | 10 |

TABLE 3

Multi-layer stretched polyamide film

|  | Ex. 3 | Comp. Ex. 4 |
|---|---|---|
| Blending ratio (wt ratio) of mixed resin (Z) | | |
| N-MXD6 | 95 | 100 |
| AR-201 | 5 | 0 |
| Thickness of the layers ($\mu$m) | | |
| Layer A | 15 | 15 |
| Layer B | 10 | 10 |
| Layer C | 20 | 21 |
| Total thickness | 75 | 77 |
| Evaluation | | |
| Cloudiness (%) | 7.2 | 4.2 |
| Oxygen permeability (cc/m$^2$ · day · atm) | 3.4 | 3.8 |
| Impact piercing strength (Kg-cm) | 25.7 | 17.1 |
| Number of pinholes (per 500 times) | 0 | 10 |

What is claimed is:

1. A stretched polyamide film obtained by melt-kneading and extruding a mixed resin (Z) containing a polyamide resin (X) and a modified resin (Y) into a film followed by biaxial stretching, wherein:

said polyamide resin (X) is obtained by polycondensing a diamine component containing not less than 70 mol % of a metaxylylenediamine with a dicarboxylic acid component containing not less than 70 mol % of an α,ω-aliphatic dicarboxylic acid having 6 to 12 carbon atoms;

said modified resin (Y) is obtained by graft-modifying an ethylene-ethyl acrylate copolymer resin with a maleic anhydride; and said mixed resin (Z) contains from 80 to 99% by weight of said polyamide resin and from 20 to 1% by weight of said modified resin.

2. A stretched polyamide film according to claim 1, wherein the α,ω-aliphatic dicarboxylic acid having 6 to 12 carbon atoms is an adipic acid.

3. A multi-layer film obtained by laminating another thermoplastic resin film on the stretched polyamide film of claim 1.

4. A multi-layer stretched polyamide film obtained by biaxially stretching a multi-layer film that is obtained by melting and simultaneously extruding a mixed resin (Z) containing a polyamide resin (X) and a modified resin (Y), an adhesive resin and a thermoplastic resin (excluding the polyamide resin (X) and the modified resin (Y)), wherein:

said polyamide resin (X) is obtained by polycondensing a diamine component containing not less than 70 mol % of a metaxylylenediamine with a dicarboxylic acid component containing not less than 70 mol % of an α,ω-aliphatic dicarboxylic acid having 6 to 12 carbon atoms;

said modified resin (Y) is obtained by graft-modifying an ethylene-ethyl acrylate copolymer resin with a maleic anhydride; and said mixed resin (z) contains from 80 to 99% by weight of said polyamide resin and from 20 to 1% by weight of said modified resin.

5. A multi-layer stretched polyamide film according to claim 4, wherein the α, ω-aliphatic dicarboxylic acid having 6 to 12 carbon atoms is an adipic acid.

* * * * *